C. V. WRIGHT.
GEAR.
APPLICATION FILED MAR. 27, 1922.
1,435,571. Patented Nov. 14, 1922.
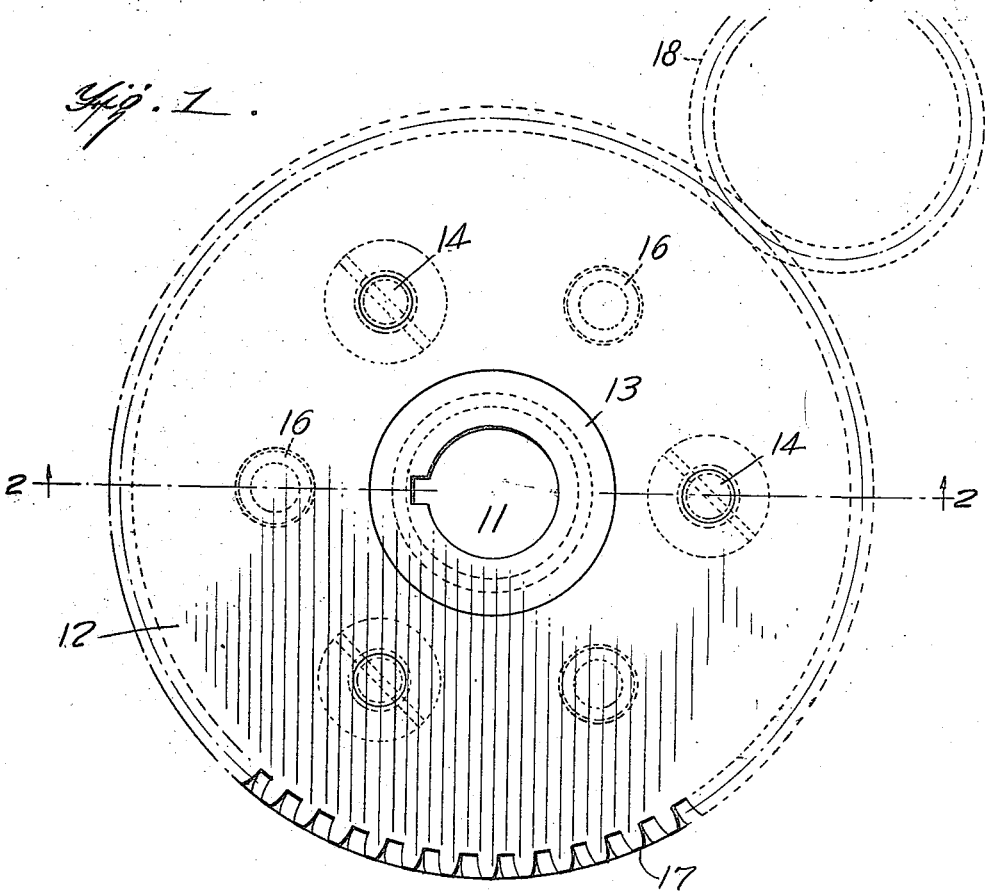
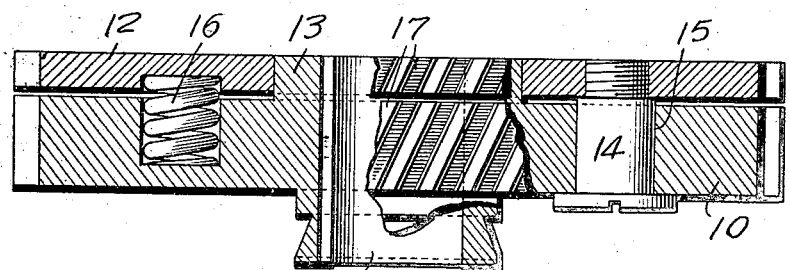
Inventor
Chas. V. Wright.
By Chas. J. Williamson
Attorney Patented Nov. 14, 1922.

1,435,571

UNITED STATES PATENT OFFICE.

CHARLES V. WRIGHT, OF TAMAQUA, PENNSYLVANIA.

GEAR.

Application filed March 27, 1922. Serial No. 547,233.

*To all whom it may concern:*

Be it known that I, CHARLES V. WRIGHT, residing at Tamaqua, county of Schuylkill, and State of Pennsylvania, a citizen of the United States, have invented certain new and useful Improvements in Gears, of which the following is a specification.

The object of my invention is to provide a toothed gear in which the intermeshing of the teeth will be effected without play or lost motion and which therefore will be free from blacklash and the accompanying noise and wear that results from play or lost motion and will secure this important result with simplicity of construction. My invention consists in a gear having such construction as is defined by or included within the meaning or scope of the appended claims.

In the annexed drawings:

Fig. 1 is a side elevation of a spur gear embodying my invention;

Fig. 2 is a section on the line 2—2 of Fig. 1 with a portion of the gear shown in elevation.

Briefly described, my gear is composed of two parts of like diameter placed side by side and slidably joined so that they may separate or approach by movement in an axial line, and which are slidably held apart by spring means, the teeth on the periphery of the two parts being placed obliquely or slanting and so arranged that adjacent teeth aline when the two parts are pressed together, but are out of alinement when the two parts are pressed away from one another.

Referring now in detail to what is shown in the drawings, my gear there shown is composed of two side by side, circular parts or disks, one, which for convenience of designation I will term the main disk, 10, which has the central hole 11, for the shaft, and the other, which for convenience of description, I term the supplementary disk, 12, and which has a central hole that slidably fits a concentric hub or circular boss, 13, on the main disk, and at equi-distant points headed screws, 14, connect the two disks so that they are rotatably joined, but capable of limited sliding movement axially, this being accomplished by having each screw pass through a hole, 15, in the main disk which it slidably fits with its head on the outer side of the latter, and having its threaded end portion secured in a threaded hole in the other disk. Several coil springs, 16, placed between the two disks and seated in alining sockets, or recesses therein, yieldably press the two disks apart to the limit allowed by the contact of the screw heads with the outer side of the main disk.

The teeth, 17, on the periphery of the disks extend obliquely with reference to the gear axis and when the two disks are separated under the action of the springs, the ends of adjacent teeth at adjacent or the inner sides of the two disks, are displaced in a circumferential direction with the result that when the meshing tooth of a companion gear, 18 (which is of usual construction), enters into the tooth space of my gear, that space being less in width than the normal intertooth space, will be completely filled by the entering tooth, and as the entrance of the latter progresses it will, by a camming action on the inclined face of the tooth of the supplemental disk, move the latter axially against the force of the springs, until the teeth of the two disks are in alinement, and as the entering tooth withdraws, the close contact of the sides of the disk tooth therewith will, under the follow up action of the springs, continue, and thus at all times no space will exist between the sides of the intermeshing teeth to result in noise and wear.

As the pins or screws, 14, prevent the supplemental disk from turning on the boss or hub, 13, so that the only movement is in an axial direction, it will be seen that there can be no backlash.

What I claim is:

1. A gear comprising side by side peripherally toothed members, with obliquely extending teeth on both, means slidably connecting said members for axial movement, and yieldable means pressing them apart.

2. A gear comprising side by side disks having spur teeth on the periphery that extend obliquely, means slidably connecting one disk to the other for axial movement, and spring means between the disks pressing them apart.

In testimony whereof I hereunto affix my signature.

CHARLES V. WRIGHT.